3,428,612
DIEPOXIDE COMPOSITIONS
Samuel W. Tinsley, South Charleston, Paul S. Starcher, Charleston, and Charles W. McGary, Jr. and Charles T. Patrick, Jr., South Charleston, W. Va., assignors to Union Carbide Corporation, a corporation of New York
No Drawing. Filed Oct. 5, 1960, Ser. No. 60,587
U.S. Cl. 260—78.4      24 Claims
Int. Cl. C08g 30/12; C07d 1/00

This invention relates to the preparation of novel diepoxide monomers. In one aspect, the invention relates to curable, polymerizable compositions comprising a diepoxide monomer, a catalyst, and/or an active organic hardener. In various other aspects, the invention relates to the fusible thermosetting intermediate reaction products and to cured polymerized products which result from the aforementioned curable compositions.

The polymerizable compositions of the invention can be readily handled in resin-forming operations such as coating, laminating, bonding, molding, casting, potting, and the like. These polymerizable compositions are capable of accepting solid materials, such as fillers and pigments, for providing various effects in physical properties and coloration. With or without such added solid materials, the polymerizable compositions can be made to fill small intricacies of molds without the necessity of applying high pressures or heating to high temperatures, although such measures can be employed, if desired. The polymerizable compositions also can be easily spread, brushed, or sprayed by many techniques available in the paint, lacquer, and varnish industries for making coatings and finishes. Negligible shrinkage, if any, occurs in curing to the resin. The polymerizable compositions are capable of being accurately shaped by molds having intricate molding surfaces and fully cured to resins carrying exact details of such molding surfaces. They can be also advantageously employed in the potting of such fragile articles as electronic components.

The curable, polymerizable compositions of the invention also can be partially reacted at elevated temperatures to form viscous thermosetting liquids or thermosetting solids. The resulting fusible thermosetting intermediate reaction products can be dissolved in an inert normally-liquid organic medium and applied as heat-curable coatings. To aid solution, the thermosetting solid products can be powdered or granulated, if desired. The thermosetting solids also can be used as molding powder compositions which can be converted to fully cured solid products by the application of heat and/or pressure. Numerous other uses, applications, and unexpected advantages and results will become apparent upon a consideration of the various embodiments of the invention which are discussed hereinafter.

Accordingly, one or more of the following objects will be achieved by the practice of the invention.

It is an object of the invention to prepare novel diepoxide monomers described hereinafter. It is another object of the invention to prepare novel homopolymerized products of said diepoxide monomers. It is, also, an object of the invention to prepare novel curable, partially cured, and cured compositions comprising a diepoxide monomer and an active organic hardener. It is another object of the invention to prepare novel curable, polymerizable compositions comprising a diepoxide monomer, an active organic hardener, and a modifying amount of a different active organic compound to thereby impart special and desirable characteristics and properties to ultimately, fully cured compositions. It is a further object of the invention to prepare novel curable compositions and partially cured compositions (fusible thermosetting intermediate reaction products) comprising a diepoxide monomer and an active organic hardener which compositions when dissolved in an inert normally-liquid organic medium are useful in the fields of coatings, laminates, adhesives, and the like. A still further object of the invention is to prepare novel fusible thermosetting intermediate reaction solid products resulting from the partial reaction of a composition comprising a diepoxide monomer and an active organic hardener which products are useful as molding powder compositions. A yet further object of the invention is to provide novel curable and fully cured compositions comprising a diepoxide monomer, a poly-carboxylic acid anhydride, and an ethylenically unsaturated organic compound. Another object of the invention is to provide novel and useful high molecular weight polymeric varnish compositions which result from the homopolymerization of the hydroxy- and epoxy-containing products prepared by the reaction of a diepoxide monomer and an aliphatic hydrocarbon mono-carboxylic acid. It is also an object of the invention to prepare novel and useful high molecular weight polymeric varnish compositions which result from the esterification of fusible, soluble polymeric polyhydric alcohols with organic fatty acids, said polymeric polyhydric alcohols being prepared by the reaction of a diepoxide monomer and a polyol. Numerous other objects of the present invention will become apparent to those skilled in the art from a consideration of the disclosure.

The novel and useful diepoxides contemplated in the invention can be characterized by the following formula:

(I) 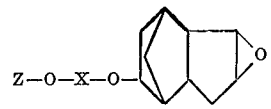

wherein Z can be (1) a vicinal-epoxyalkyl radical in which the vicinal epoxy group is at least one carbon atom removed from its appropriate oxygen atom shown in the above formula, (2) a vicinal-epoxycycloalkyl radical in which the vicinal epoxy group is contained in the cycloaliphatic ring, said epoxy group being at least one carbon atom removed from its appropriate oxygen atom, (3) a vicinal-epoxycycloalkylalkyl radical in which the vicinal epoxy group is contained in the cycloaliphatic ring, (4) a 3-oxatricyclo[3.2.1.0$^{2,4}$]oct-6-yl radical, (5) a 3-oxatricyclo[3.2.1.0$^{2,4}$]oct-6-ylalkyl radical, or (6) a 4-oxatetracyclo[6.2.1$^{2,7}$.0$^{3,5}$]undec-9-yl radical; and wherein X can be (a) carbonyl, i.e.,

or (b) the unit,

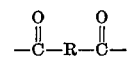

in which R represents the residue after removal of the two carboxy groups of a hydrocarbon dicarboxylic acid. It should be noted at this time that the expression "vicinal epoxy," as used herein including the appended claims, refers to the

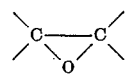

group. The notation that the vicinal epoxy group is contained in the cycloaliphatic ring indicates that the carbon atoms of said vicinal epoxy group form a part of the cycloaliphatic ring or nucleus. The cycloaliphatic ring preferably contains from 5 to 7 carbon atoms including the epoxy carbon atoms. In addition, the expression "lower alkyl," as used herein including the appended claims, refers to a monovalent saturated aliphatic hydrocarbon radical which contains from 1 to 4 carbon atoms. The "alkyl" moiety in the expressions "vicinal-epoxycycloalkylalkyl" (second occurrence) and "3-oxatricyclo[3.2.1.0$^{2,4}$]oct-6-ylalkyl" indicates that this moiety preferably contains up to 7 carbon atoms. With reference to the unit, $$-\overset{O}{\underset{\|}{C}}-R-\overset{O}{\underset{\|}{C}}-$$

the R variable represents, preferably a divalent aliphatic or cycloaliphatic hydrocarbon radical which contains up to 12 carbon atoms. Encompassed within the unit, $$-\overset{O}{\underset{\|}{C}}-R-\overset{O}{\underset{\|}{C}}-$$

include, among others, the divalent diacyl radicals of the saturated aliphatic hydrocarbon dicarboxylic acids, e.g., oxalic acid, malonic acid, adipic acid, and the like; the divalent diacyl radicals of the saturated cycloaliphatic hydrocarbon dicarboxylic acids, e.g., 1,2-cyclopentanedicarboxylic acid, 1,3-cyclopentanedicarboxylic acid, lower alkyl substituted-1,2-cyclohexanedicarboxylic acid, 1,2-cyclohexanedicarboxylic acid, 1,4-cyclohexanedicarboxylic acid, 1,3-cyclobutanedicarboxylic acid, and the like; the mono-olefinically unsaturated aliphatic hydrocarbon dicarboxylic acids in which the ethylenic group, $$\diagdown C = C \diagup$$

is alpha, beta, to at least one carbonyl group, e.g., maleic acid, fumaric acid, itaconic acid, and the like; the divalent diacyl radicals of the mono-olefinically unsaturated cycloaliphatic hydrocarbon dicarboxylic acids in which the ethylenic group preferably is alpha, beta to both carbonyl groups, e.g., 1-cyclohexene-1,2-dicarboxylic acid, and the like.

With reference to Formula I supra, illustrative Z variables include, among others, 2,3-epoxypropyl,
2,3-epoxybutyl,
2-methyl-2,3-epoxypropyl,
2-methyl-2,3-epoxybutyl,
2,3-epoxypentyl,
2,3-epoxyhexyl,
2,3-epoxyoctyl,
4,5-epoxyhexyl,
4,5-epoxypentyl,
5,6-epoxyoctyl,
10,11-epoxyundecyl,
9,10-epoxydecyl,
9,10-epoxyoctadecyl,
2,3-epoxycyclopentyl,
4-methyl-2,3-epoxycyclopentyl,
4-isopropyl-2,3-epoxycyclopentyl,
3,4-epoxycyclohexyl,
3-ethyl-3,4-epoxycyclohexyl,
4-methyl-2,3-epoxycyclohexyl,
6-n-butyl-3,4-epoxycyclohexyl,
5-amyl-3,4-epoxycyclohexyl,
2,4-diethyl-3,4-epoxycyclohexyl,
3,4-epoxycycloheptyl,
4,5-epoxycycloheptyl,
2-ethyl-3,4-epoxycycloheptyl,
2,3-epoxycyclopentylmethyl,
4-methyl-2,3-epoxycyclopentylethyl,
3,4-epoxycyclohexylmethyl,
2-n-propyl-3,4-epoxycyclohexylmethyl,
5-ethyl-3,4-epoxycyclohexylpropyl,
3,4-epoxycyclohexylamyl,
3,4-epoxycycloheptylmethyl,
3,4-epoxycycloheptylethyl,
3-oxatricyclo[3.2.1.4$^{2,4}$]oct-6-yl,
lower alkyl substituted-3-oxatricyclo[3.2.1.0$^{2,4}$]oct-6-yl,
4-oxatetracyclo[6.2.1.0$^{2,7}$.0$^{3,5}$]undec-9-yl,
lower alkyl substituted-4-oxatetracyclo[6.2.1.0$^{2,7}$.0$^{3,5}$]undec-9-yl, and the like.

Illustrative X variables include, for example, oxalyl, mayonyl, succinyl, glutaryl, adipyl, octanedioyl, decanedioyl, dodecanedioyl, octadecanedioyl, 1,2-cyclopentanedioyl, 1,3-cyclopentanedioyl, 1,2-cyclohexanedioyl, lower alkyl substituted-1,4-cyclohexanedioyl, 1,4-cyclohexanedioyl, maleoyl, fumaroyl, itaconoyl, Δ$^1$-tetrahydrophthaloyl, and the like.

Illustrative subclasses of novel diepoxides which are contemplated in the invention include, for instance, the the vicinal-epoxyalkyl 4-oxatetracyclo[6.2.1.0$^{2,7}$.0$^{3,5}$] undec-9-yl hydrocarbondicarboxylates,
the vicinal-epoxycycloalkyl 4-oxatetracyclo[6.2.1.0$^{2,7}$.0$^{3,5}$]undec-9-yl hydrocarbondicarboxylates,
the vicinal-epoxycycloalkylalkyl 4-oxatetracyclo [6.2.1.0$^{2,7}$.0$^{3,5}$]undec-9-yl hydrocarbondicarboxylates,
the 3-oxatricyclo[3.2.1.0$^{2,4}$]oct-6-yl 4-oxatetracyclo-[6.2.1.0$^{2,7}$.0$^{3,5}$]undec-9-yl hydrocarbondicarboxylate,
the 3-oxatricyclo[3.2.1.0$^{2,4}$]oct-6-ylalkyl 4-oxatetracyclo [6.2.1.0$^{2,7}$.0$^{3,5}$]undec-9-yl hydrocarbondicarboxylates,
the bis(4-oxatetracyclo[6.2.1.0$^{2,7}$.0$^{3,5}$]undec-9-yl)
the vicinal-epoxyalkyl 4-oxatetracyclo[6.2.1.0$^{2,7}$.0$^{3,5}$] hydrocarbondicarboxylates,
undec-9-yl carbonates,
the vicinal-epoxyclycoalkyl 4-oxatetracyclo [6.2.1.0$^{2,7}$.0$^{3,5}$]undec-9-yl carbonates,
the vicinal-epoxycycloalkylalkyl 4-oxatetracyclo [6.2.1.0$^{2,7}$.0$^{3,5}$]undec-9-yl carbonates,
the 3-oxatricyclo[3.2.1.0$^{2,4}$]oct-6-ylalkyl 4-oxatetracyclo [6.2.1.0$^{2,7}$.0$^{3,5}$]undec-9-yl carbonates,
the vicinal-epoxyalkyl 4-oxatetracyclo [6.2.1.0$^{2,7}$.0$^{3,5}$] undec-9-yl oxalates,
the vicinal epoxyclcloalkyl 4-oxatetracyclo[6.2.1.0$^{2,7}$.0$^{3,5}$]undec-9-yl malonates,
the vicinal-epoxycycloalkylalkyl 4-oxatetracyclo [6.2.1.0$^{2,7}$.0$^{3,5}$]undec-9-yl succinates
the 3-oxatricyclo[3.2.1.0$^{2,4}$]oct-6-ylalkyl 4-oxatetracyclo [6.2.1.0$^{2,7}$.0$^{3,5}$]undec-9-yl adipates,
the vicinal-epoxyalkyl 4-oxatetracyclo[6.2.1.0$^{2,7}$.0$^{3,5}$] undec-9-yl maleates,
the vicinal-epoxyalkyl 4-oxatetracyclo[6.2.1.0$^{2,7}$.0$^{3,5}$] undec-9-yl fumarates,
the vicinal-epoxyalkyl 4-oxatetracyclo[6.2.1.0$^{2,7}$.0$^{3,5}$] undec-9-yl itaconates,
the vicinal-epoxycycloalkyl 4-oxatetracyclo[6.2.1.0$^{2,7}$.0$^{3,5}$]undec-9-yl maleates,
the vicinal-epoxycycloalkylalkyl 4-oxatetracyclo [6.2.1.0$^{2,7}$.0$^{3,5}$]undec-9-yl fumarates,
the 3-oxatricyclo[3.2.1.0$^{2,4}$]oct-6-ylalkyl 4-oxatetracyclo [6.2.1.0$^{2,7}$.0$^{3,5}$]undec-9-yl itaconates, and the like.

Specific examples of novel diepoxides include, for example 2,3-epoxypropyl 4-oxatetracyclo[6.2.1.0$^{2,7}$.0$^{3,5}$] undec-9-yl carbonate,
2,3-epoxybutyl 4-oxatetracyclo[6.2.1.0$^{2,7}$.0$^{3,5}$]undec-9-yl carbonate,
10,11-epoxyundecyl 4-oxatetracyclo[6.2.1.0$^{2,7}$.0$^{3,5}$] undec-9-yl carbonate,
2,3-epoxycyclopentyl-4-oxatetracyclo[6.2.1.0$^{2,7}$.0$^{3,5}$] undec-9-yl carbonate,
3,4-epoxycyclohexyl 4-oxatetracyclo[6.2.1.0$^{2,7}$.0$^{3,5}$]undec-9-yl carbonate,
3-oxatricyclo[3.2.1.0$^{2,4}$]oct-6-yl 4-oxatetracyclo-[6.2.1.0$^{2,7}$.0$^{3,5}$]undec-9-yl carbonate.
bis(4-oxatetracyclo[6.2.1.0$^{2,7}$.0$^{3,5}$]undec-9-yl] carbonate,
2,3-epoxypropyl 4-oxatetracyclo[6.2.1.0$^{2,7}$.0$^{3,5}$] undec-9-yl oxalate,
2,3-epoxypentyl 4-oxatetracyclo[6.2.1.0$^{2,7}$.0$^{3,5}$]undec-9-yl malonate,
9,10-epoxyoctadecyl 4-oxatetracyclo[6.2.1.0$^{2,7}$.0$^{3,5}$] undec-9-yl glutarate,
2,3-epoxycyclopentyl 4-oxatetracyclo[6.2.1.0$^{2,7}$.0$^{3,5}$] undec-9-yl succinate, bis(4-oxatetracyclo[6.2.1.0$^{2,7}$.0$^{3,5}$] undec-9-yl) oxalate,
bis(4-oxatetracyclo[6.2.1.0$^{2,7}$.0$^{3,5}$]undec-9-yl)
  malonate,
bis(4-oxatetracyclo[6.2.1.0$^{2,7}$.0$^{3,5}$]undec-9-yl)
  adipate,
bis(4-oxatetracyclo[6.2.1.0$^{2,7}$.0$^{3,5}$]undec-9-yl) maleate,
bis(4-oxatetracyclo[6.2.1.0$^{2,7}$.0$^{3,5}$]undec-9-yl)
  fumarate,
bis(4-oxatetracyclo[6.2.1.0$^{2,7}$.0$^{3,5}$]undec-9-yl)
  itaconate,
bis(4-oxatetracyclo[6.2.1.0$^{2,7}$.0$^{3,5}$]undec-9-yl)
  $\Delta^1$-tetrahydrophthalate,
bis(4-oxatetracyclo[6.2.1.0$^{2,7}$.0$^{3,5}$]undec-9-yl)
  succinate,
bis(4-oxatetracyclo[6.2.1.0$^{2,7}$.0$^{3,5}$]undec-9-yl)
  glutarate,
2,3-epoxypropyl 4-oxatetracyclo[6.2.1.0$^{2,7}$.0$^{3,5}$]undec-9-yl maleate,
2,3-epoxypropyl 4-oxatetracyclo[6.2.1.0$^{2,7}$.0$^{3,5}$]undec-9-yl fumarate,
2,3-epoxyhexyl 4-oxatetracyclo[6.2.1.0$^{2,7}$.0$^{3,5}$]undec-9-yl maleate,
2,3-epoxycyclopentylmethyl 4-oxatetracyclo
  [6.2.1.0$^{2,7}$.0$^{3,5}$]undec-9-yl maleate,
3,4-epoxycyclohexyl 4-oxatetracyclo[6.2.1.0$^{2,7}$.0$^{3,5}$]
  undec-9-fumarate,
3-oxatricyclo[3.2.1.0$^{2,4}$]oct-6-yl 4-oxatetracyclo
  [6.2.1.0$^{2,7}$.0$^{3,5}$]undec-9-yl maleate,
3-oxatricyclo[3.2.1.0$^{2,4}$]oct-6-yl 4-oxatetracyclo
  [6.2.1.0$^{2,7}$.0$^{3,5}$]undec-9-yl fumarate,
3-oxatricyclo[3.2.1.0$^{2,4}$]oct-6-yl 4-oxatetracyclo
  [6.2.1.0$^{2,7}$.0$^{3,5}$]undec-9-yl itaconate,
3-oxatricyclo[3.2.1.0$^{2,4}$]oct-6-yl 4-oxatetracyclo
  [6.2.1.0$^{2,7}$.0$^{3,5}$]undec-9-yl glutarate,
3-oxatricyclo[3.2.1.0$^{2,4}$]oct-6-yl 4-oxatetracyclo
  [6.2.1.0$^{2,7}$.0$^{3,5}$]undec-9-yl succinate,
3-oxatricyclo[3.2.1.0$^{2,4}$]oct-6-yl 4-oxatetracyclo
  [6.2.1.0$^{2,7}$.0$^{3,5}$]undec-9-yl malonate,
3-oxatricyclo[3.2.1.0$^{2,4}$]oct-6-yl 4-oxatetracyclo
  [6.2.1.0$^{2,7}$.0$^{3,5}$]undec-9-yl oxalate,
3-oxatricyclo[3.2.1.0$^{2,4}$]oct-6-yl 4-oxatetracyclo
  [6.2.1.0$^{2,7}$.0$^{3,5}$]undec-9-yl $\Delta^1$-tetrahydrophthalate,
3-oxatricyclo[3.2.1.0$^{2,4}$]oct-6-yl 4-oxatetracyclo
  [6.2.1.0$^{2,7}$.0$^{3,5}$]undec-9-yl adipate,
3,4-epoxycyclohexylmethyl 4-oxatetracyclo
  [6.2.1.0$^{2,7}$.0$^{3,5}$]undec-9-yl maleate,
3,4-epoxycyclohexylmethyl 4-oxatetracyclo
  [6.2.1.0$^{2,7}$.0$^{3,5}$]undec-9-yl fumarate,
3,4-epoxycyclohexylmethyl 4-oxatetracyclo
  [6.2.1.0$^{2,7}$.0$^{3,5}$]undec-9-yl itaconate,
3,4-epoxycyclohexylmethyl 4-oxatetracyclo
  [6.2.1.0$^{2,7}$.0$^{3,5}$]undec-9-yl $\Delta^1$-tetrahydrophathalate.
3,4-epoxycyclohexylmethyl 4-oxatetracyclo
  [6.2.1.0$^{2,7}$.0$^{3,5}$]undec-9-yl adipate,
3,4-epoxycyclohexylmethyl 4-oxatetracyclo
  [6.2.1.0$^{2,7}$.0$^{3,5}$]undec-9-yl oxalate,
3,4-epoxycyclohexylmethyl 4-oxatetracyclo
  [6.2.1.0$^{2,7}$.0$^{3,5}$]undec-9-yl succinate, and the like.

The novel symmetrical and unsymmetrical diepoxides of the invention can be prepared by various routes. One route involves the reaction of the corresponding symmetrical or unsymmetrical, non-epoxidized, olefinic precursor, for example alkenyl tricyclo[5.2.1.0$^{2,6}$]dec-3-en-8-yl oxalate,
alkenyl tricyclo[5.2.1.0$^{2,6}$]dec-3-en-8-yl carbonate,
cycloalkenyl tricyclo[5.2.1.0$^{2,6}$]dec-3-en-8-yl adipate,
bicyclo[2.2.1]hept-2-en-5-yl tricyclo[5.2.1.0$^{2,6}$]
  dec-3-en-8-yl-maleate,
bis(tricyclo[5.2.1.0$^{2,6}$]dec-3-en-8-yl) fumarate, and the like, preferably with an organic peracid.

Among the peracids contemplated include, for example, the aliphatic peracids, the cycloaliphatic peracids, the aromatic peracids, and the like. The organic hydrocarbon peracids are preferred. Illustrative peracids include, for instance, peracetic acid, perpropionic acid, perbutyric acid, perhexanoic acid, perdodecanoic acid, perbenzoic acid, monoperphthalic acid, and the like. The lower aliphatic hydrocarbon peracids which contain from 2 to 4 carbon atoms are highly suitable. Peracetic acid is most preferred. It is highly desirable to employ the peracid as a solution in an inert normally liquid organic vehicle such as ethyl acetate, butyl acetate, acetone, and the like. A solution comprising from about 10 to 50 weight percent of peracid, based on the total weight of peracid and inorganic vehicle is suitable; from about 20 to 40 weight percent of peracid is preferred. The epoxidation reaction can be conducted at a temperature in the range of from about 0° C., and lower, to about 100° C., and higher, and preferably from about 20° to about 80° C. Theoretically, to effect complete diepoxidation of the olefinic precursor, at least a stoichiometric quantity of peracid per carbon to carbon double bond of said precursor (excluding the carbon to carbon double bond, if any, in the dicarboxylic acid moiety of the olefinic precursor) should be employed. However, since some degradation of the peracid occurs during the epoxidation reaction, it is necessary to use an amount of peracid which is greater than the stoichiometric ratio explained supra, e.g., about 25 percent greater than the stoichiometric amount explained previously. In this manner, oxirane oxygen is introduced at the site of the carbon to carbon double bond of each alcohol moiety of the olefinic precursor. When the acid moiety, i.e.,

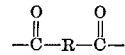

contains an ethylenic group which is alpha to either or both carbonyl groups, e.g.,

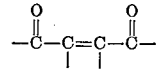

or

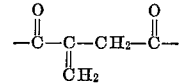

the epoxidation reaction is selective to the ethylenic group contained in each alcohol moiety. An ethylenic group which is conjugated with both carbonyl groups, i.e.,

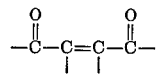

is extremely resistant toward epoxidation whereas an ethylenic group which is conjugated with one of the carbonyl groups, e.g.,

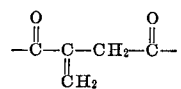

undergoes essential epoxidation only after epoxidation has occured at the ethylenic groups of the alcohol moieties. Consequently, the epoxidation reaction is conducted for a period of time sufficient to introduce oxirane oxygen at the site of the carbon to carbon double bonds present in the alcohol moieties of the olefinic precursor. Periodic analysis of samples of the reaction mixture to determine the quantity of peracid consumed during the epoxidation reaction can be readily performed by the operator by well-known techniques. At the termination of the epoxidation reaction, the unreacted olefinic precursor, acid by-product, inert vehicle, if employed, and the like, can be recovered from the reaction product mixture, for example, by distillation under reduced pressure. Further well-known purification techniques can be employed, as desired.

The symmetrical olefinic esters of saturated and ethylenically unsaturated dicarboxylic acid precursors, in turn, can be prepared by the esterification reaction of the tricyclo[5.2.1.0$^{2,6}$]dec-3-en-8-ol with the appropriate dibasic acid, e.g., oxalic acid, adipic acid, maleic acid, fumaric acid, itaconic acid, etc., at an elevated temperature, and preferably under xylene refluxing to remove the water formed during the reaction. The resulting reaction product mixture can be purified via well known techniques to recover the desired symmetrical olefinic ester precursor.

The transesterification reaction of one mol of the dialkyl ester of a saturated dibasic acid, e.g., diethyl malonate, with at least two mols of tricyclo[5.2.1.0$^{2,6}$]dec-3-en-8-ol, in the presence of an alkali metal alkoxide catalyst, e.g., sodium methoxide, at an elevated temperature, also will yield the symmetrical olefinic ester precursor.

The unsymmetrical olefinic esters of saturated and ethylenically unsaturated dicarboxylic acid precursors can be prepared by the esterification reaction of up to one mol of the appropriate alcohol, e.g., alkenol, cycloalkenol, cycloalkenylalkanol, bicyclo[2.2.1]hept-5-en-2-ol, etc., with one mol of the appropriate dibasic acid anhydride, e.g., succinic anhydride, glutaric anhydride, maleic anhydride, fumaric anhydride, $\Delta^1$-tetrahydrophthalic anhydride, etc., preferably in the presence of an acidic or basic catalyst, at room temperature or at an elevated temperature, to give the monocarboxy monoester product, followed by esterifying said product with tricyclo[5.2.1.0$^{2,6}$]dec-3-en-8-ol to thus yield the unsymmetrical olefinic ester precursor. The following schematic equation illustrates this preparation:

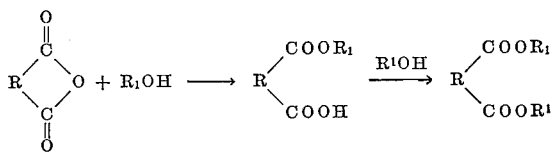

The unsymmetrical olefinic esters of saturated dicarboxylic acid precursors also can be prepared by the reaction of one mol of the dialkenyl ester of a saturated dibasic acid, e.g., diallyl malonate, diallyl adipate, etc., with one mol of tricyclo[5.2.1.0$^{2,6}$]dec-3-en-8-ol, in the presence of an alkali metal alkoxide catalyst, e.g., sodium ethoxide, at an elevated temperature, to yield a reaction product mixture which contains the desired unsymmetrical olefinic ester precursor. Well known purification techniques such as distillation, fractionation, and the like, can be employed to recover the desired product.

The symmetrical and unsymmetrical olefinic carbonate precursors can be prepared by the reaction of tricyclo[5.2.1.0$^{2,6}$]dec-3-en-8-ol with excess phosgene, in the presence of a basic catalyst, at room temperature or at an elevated temperature, to produce the chloroformate ester of tricyclo[5.2.1.0$^{2,6}$]dec-3-en-8-ol as the resulting product. This product then can be reacted with an excess of an olefinically unsaturated alcohol, e.g., alkenol, cycloalkenol, cycloalkenylalkanol, bicyclo[2.2.1]hept-5-en-2-ol, and the like, to yield the unsymmetrical olefinic carbonate precursor as the final product. The following schematic equation represents the preparation of the carbonate precursors under discussion.

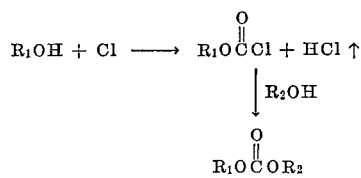

Of course, the reaction of more than two mole of tricyclo[5.2.1.0$^{2,6}$]dec-3-en-8-ol with up to one mol of phosgene would produce, in a single step, the bis(tricyclo[5.2.1.0$^{2,6}$]dec-3-en-8-yl) carbonate.

The preparation of tricyclo[5.2.1.0$^{2,6}$]dec-3-en-8-ol is effected by the reaction of dicyclopentadiene with an aqueous solution of an inorganic acidic catalyst, e.g., an aqueous solution of 25 weight percent sulfuric acid, at an elevated temperature, e.g., from about 75° C., and lower to about 125° C., and higher.

In one aspect, the invention is directed to the preparation of novel polymeric products of the diepoxides characterized by Formula I supra. These novel polymeric products can be prepared by homopolymerizing a single monomeric diepoxide, or by copolymerizing a mixture of monomeric diepoxides, in the presence of an acidic or basic catalyst described hereinafter, at a temperature in the range of from about 25° C., and lower, to about 250° C., and higher, and for a period of time sufficient to produce said polymeric products. These useful products can range from viscous liquids to hard, tough resins.

The acidic and basic catalysts which can be employed in the polymerization reaction include, for example, the metal halide Lewis acids, e.g., boron trifluoride, aluminum chloride, zinc chloride, stannic chloride, ferric chloride, boron trifluoride-piperidine complex, boron trifluoride-1,6-hexanediamine complex, boron trifluoride-monoethylamine complex, boron trifluoride-dimethyl ether complex, boron trifluoride-diethyl ether complex, boron trifluoride-dipropyl ether complex, and the like; the strong mineral acids, e.g., sulfuric acid, phosphoric acid, polyphosphoric acid, perchloric acid, and the like; the saturated aliphatic hydrocarbon sulfonic acids and the aromatic hydrocarbon sulfonic acids, e.g., ethylsulfonic acid, propylsulfonic acid, benzenesulfonic acid, toluenesulfonic acid, naphthalenesulfonic acid, lower alkyl substituted-benzenesulfonic acid, and the like; the alkali metal hydroxides, e.g., sodium hydroxide, potassium hydroxide, and the like; the amines, e.g., alpha-methylbenzyl-dimethylamine, dimethylethylamine, triethylamine, tripropylamine, trimethylammonium hydroxide, and the like. When the catalyst and the novel diepoxide monomer(s) are immiscible, the catalyst can be added as a solution in an inert normally-liquid organic medium.

Catalyst concentrations and polymerization temperatures are believed to affect the polymerization rate, the higher concentrations and temperatures promoting faster reaction rates than the lower ones. The catalyst concentration can be varied over a broad range and can be selected on the basis of the rate of polymerization desired and the polymerization temperature to be used. It has been observed that a catalyst concentration in the range of from about 0.005 to 15 weight percent, preferably from about 0.01 to 5 weight percent, based on the weight of the novel diepoxide(s), is advantageous in forming useful polymeric products.

In another aspect, the invention is directed to novel curable, polymerizable compositions comprising a diepoxide(s) characterized by Formula I supra and an active organic hardener, and to the partially cured (fusible thermosetting intermediate reaction products) and cured resins resulting therefrom. The active organic hardeners illustrated hereinafter are employed in a curing amount, that is, an amount which is sufficient to cause the curable system comprising the novel diepoxide(s) to become a thermosetting or thermoset resin in accordance with the teachings of the instant specification. Representative active organic hardeners include polycarboxylic acids, polycarboxy polyesters, polycarboxylic acid anhydrides, polyols, e.g., polyhydric phenols, polyhydric alcohols, and polyhydric polyesters, polyfunctional amines, polythiols, polyisocyanates, polyisothiocyanates, polyacyl halides, and the like. The novel curable compositions can contain one monomeric diepoxide or a mixture of monomeric diepoxides as well as one active organic hardener or a mixture of active organic hardeners.

The curable compositions of the invention can be prepared by mixing the novel diepoxide(s) with the active organic hardener(s), preferably under agitation, so as to obtain a homogeneous mixture. The order of addition of the components does not appear to be critical. When a solid or highly viscous monomeric diepoxide or active organic hardener is employed, heating is advantageous in facilitating the formation of a solution. In preparing homogeneous mixtures, it is advantageous to employ a temperature which is at least as high as the melting point of the highest melting component contained in the curable mixture. In any event the application of heat should not be prolonged to the extent that appreciable curing takes place.

The curable compositions of the invention can be partially cured or fully cured by maintaining the temperature in the range of from about 25° C., and lower, to about 250° C., and higher, and preferably from about 25° to about 200° C. A higher curing temperature generally will provide a thermosetting or thermoset resin in less time than a lower curing temperature. One preferable method is to heat the curable compositions to a temperature within the range from about 50° C. to 150° C. to first partially cure the composition. A temperature from about 100° C. to 200° C. then can be used to complete the cure. However, any one or combination of two or more temperatures within the specified range of 10° C. to 250° C. can be employed, if desired, to effect the full cure. For casting purposes the preferred minimum temperature of the normally-solid curable compositions is that at which said compositions form a uniform melt, whereas for coatings and the preparation of laminates, the use of solvents will allow the use of lower temperature.

The time for effecting the partial cure or the complete cure will be governed, to an extent, on several factors such as the particular monomeric diepoxide(s) employed, the particular active organic hardener(s) employed, the proportions of monomeric diepoxide(s) and active organic hardener(s), the inclusion of an active organic hardener modifier, the inclusion of a catalyst, the concentration of the catalyst and/or modifier, the temperature for effecting the cure, and other considerations. In general, the time for effecting the complete cure can vary from several minutes to several days, e.g., from 10 minutes to 24 hours, depending upon the correlation of such factors as illustrated above.

If desired, basic or acidic catalysts such as those illustrated previously can be incorporated into the curable compositions of the invention to increase the cure rate and/or reduce the gelation period. An advantageous method is to add the catalyst to the curable mixture at substantially the lowest temperature required to form an essentially liquid curable mixture. It is generally suitable to add the catalyst to the curable composition which is maintained at a temperature in the range of from about 10° to 100° C. Agitation of the curable composition prior to, during, and after the incorporation of the catalyst is desirable to ensure a homogeneous mixture. If desired, higher temperatures may be employed with, however, the possibility of inducing premature and localized curing around catalyst particles prior to the formation of a homogeneous, curable mixture. In most cases, it may be desirable to obtain a homogeneous mixture before bringing about any substantial degree of curing and in such instances low mixing temperatures of the order specified above can be employed. Catalyst concentrations can be varied over a broad range and can be selected on the basis of the rate of cure desired and the curing temperature to be used. It has been found that catalyst concentrations from about 0.005 to 15 weight percent, preferably from about 0.01 to 5 weight percent, based on the weight of the monomeric diepoxide(s) component, are advantageous in forming valuable thermoset resins from the curable compositions.

In one preferred embodiment, the invention is directed to novel curable, partially cured, and cured compositions comprising a monomeric diepoxide characterized by Formula I supra and a polycarboxylic acid in such relative amounts so as to provide from about 0.1 to about 2.0 carboxy groups, i.e., —COOH groups, of said polycarboxylic acid per epoxy group, i.e.,

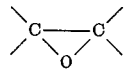

group, of said diepoxide, and preferably from about 0.3 to about 1.2 carboxy groups per epoxy group.

Representative polycarboxylic acids which can be employed include, for example, oxalic acid, malonic acid, succinic acid, glutaric acid, adipic acid, pimelic acid, suberic acid, azelaic acid, sebacic acid, alkylsuccinic acids, alkenylsuccinic acids, ethylbutenylsuccinic acid, maleic acid, fumaric acid, itaconic acid, citraconic acid, mesaconic acid, glutaconic acid, ethylidenemalonic acid, isopropylidenemalonic acid, allylmalonic acid, muconic acid, alpha-hydromuconic acid, beta-hydromuconic acid, diglycolic acid, dilactic acid, thiodiglycolic acid, 4-amyl-2,5-heptadienedioic acid, 3-hexynedioic acid, 1,2-cyclohexanedicarboxylic acid, 1,4-cyclohexanedicarboxylic acid, 2-carboxy-2-methylcyclohexaneacetic acid, phthalic acid, isophthalic acid, terephthalic acid, tetrahydrophthalic acid, tetrachlorophthalic acid, 1,8 - naphthalenedicarboxylic acid, 3-carboxycinnamic acid, 1,2-naphthalenedicarboxylic acid, 1,1,5-pentanetricarboxylic acid, 1,2,4-hexanetricarboxylic acid, 2-propyl - 1,2,4 - pentanetricarboxylic acid, 5-octene-3,3,6-tricarboxylic acid, 1,2,3-propanetricarboxylic acid, 1,2,4-benzenetricarboxylic acid, 1,3,5-benzenetricarboxylic acid, 3-hexene-2,2,3,4-tetracarboxylic acid, 1,2,3,4-benzenetetracarboxylic acid, 1,2,3,5-benzenetetracarboxylic acid, benzenepentacarboxylic acid, benzenehexacarboxylic acid, and the like. Copolymers of acrylic acid with an olefinically unsaturated monomer such as butadiene, styrene, ethyl acrylate, vinyl halide, and the like also can be employed. In addition, the dimerized and trimerized unsaturated fatty acids of, for example, linoleic acid, oleic acid, linolenic acid, undecylenic acid, and the like are useful. Polycarboxylic acids which have melting points below about 250° C. are desirable.

In a second preferred embodiment, the invention is directed to novel curable, partially cured, and cured compositions comprising a monomeric diepoxide characterized by Formula I supra and a polycarboxylic acid anhydride in such relative amounts so as to provide from about 0.1 to about 4.0 carboxy groups of the polycarboxylic acid anhydride per epoxy group of said diepoxide, and preferably from about 0.8 to about 2.5 carboxy groups per epoxy group. It should be noted that by the expression "carboxy groups of the polycarboxylic acid anhydride" is meant the carboxy groups which would be contained by the corresponding polycarboxylic acid. For example, succinic anhydride does not possess any carboxy groups per se; however, the corresponding polycarboxylic acid is succinic acid which contains two free carboxy groups. Thus, succinic anhydride has two carboxy groups as applied in the above expression. In different language, by the expression "carboxy groups of polycarboxylic acid anhydride" is meant the carboxy groups contained in the "hydrated" polycarboxylic acid anhydride.

Illustrative polycarboxylic acid anhydrides include the aliphatic, aromatic, and cycloaliphatic acid anhydrides. The preferred anhydrides are the dicarboxylic acid anhydrides, and preferably, the hydrocarbon dicarboxylic acid anhydrides which include, for example, phthalic anhydride, tetrahydrophthalic anhydride, hexahydrophthalic anhydride, chlorendic anhydride, maleic anhydride, chloromaleic anhydride, dichloromaleic anhydride, citraconic anhydride, isocitraconic anhydride, glutaric anhydride, adipic anhydride, succinic anhydride, itaconic anhydride, heptylsuccinic anhydride, hexylsuccinic anhydride, methylbutylsuccinic anhydride, methyltetrahydrophthalic anhydride, n-nonenylsuccinic anhydride, octenylsuccinic anhydride, pentenylsuccinic anhydride, propylsuccinic anhydride, 4-nitrophthalic anhydride, 1,2-naphthalic anhydride, 2,3-naphthalic anhydride, 1,8-naphthalic anhydride, tetrabromophthalic anhydride, tetraiodophthalic anhydride, and the like. Polycarboxylic acid anhydrides which have melting points below about 250° C. are desirable.

In a third preferred embodiment, the invention is directed to novel curable, partially cured, and cured compositions comprising a monomeric diepoxide characterized by Formula I supra and a polyol in such relative amounts so as to provide from about 0.1 to about 2.0 hydroxy groups, i.e., —OH groups, of said polyol per epoxy group of said diepoxide, and preferably from about 0.2 to about 1.0 hydroxy group per epoxy group. By the term "polyol," as used herein including the appended claims, is meant an organic compound having at least two hydroxyl groups, which are alcoholic hydroxy groups, phenolic hydroxy groups, or both alcoholic and phenolic hydroxy groups. The term "polyol" preferably encompasses the polyhydric alcohols and the polyhydric phenols.

Illustrative of the polyols contemplated include, for example, the aliphatic and cycloaliphatic polyhydric alcohols, e.g., ethylene glycol, diethylene glycol, the polyethylene glycols, propylene glycol, the polypropylene glycols, the polyethylenepolypropylene glycols, trimethylene glycol, the butanediols, the butenediols, the pentanediols, the pentenediols, 2-ethyl-1,3-hexanediol, the hexenediols, 2-methoxy - 2,4 - dimethyl - 1,5 - pentanediol, 12,13-tetracosanediol, polyglycerol, 1,1,1-trimethylolpropane, pentaerythritol, sorbitol, the polyvinyl alcohols, the octenediols, the cyclopentanediols, the cyclohexanediols, the lower alkyl substituted-cyclohexanediols, inositol, trimethylolbenzene; and the polyhydric phenols, e.g., resorcinol, catechol, pyrogallol, hydroquinone, the dihydroxytoluenes, dihydroxyxylene, bis(4 - hydroxyphenyl - 2,2 - propane, bis(4-hydroxyphenyl)methane, 1,9-naphthalenediol, the polyhydric phenol-formaldehyde condensation products, and the like. The alkylene oxide adducts, e.g., ethylene oxide, propylene oxide, etc., of polyhydric alcohols or polyhydric phenols such as those illustrated above also are highly suitable. Polyols having melting points below about 250° C. are desirable.

A fourth preferred embodiment of the invention is directed to novel curable, partially cured, and cured compositions comprising a monomeric diepoxide characterized by Formula I supra and a polycarboxy polyester in such relative amounts so as to provide from about 0.1 to about 2.0 carboxy groups of said polycarboxy polyester per epoxy group of said diepoxide, and preferably from about 0.3 to about 1.2 carboxy groups per epoxy group. By the term "polycarboxy polyester," as used herein including the appended claims, is meant a polyester which contains at least two carboxy groups in the average molecule. The polycarboxy polyesters can be prepared by known condensation procedures, employing mol ratios favoring greater than equivalent amounts of polycarboxylic acid anhydrides with relation to the polyhydric alcohol. More specifically, the amount of polycarboxylic acid or polycarboxylic acid anhydride which is employed in the esterification reaction should contain more carboxy groups, collectively, than are required to react with the hydroxy groups contained in the amount of polyhydric alcohol so that the resulting esterified product, i.e., polycarboxy polyester, contains at least two free carboxy groups in the average polycarboxy polyester molecule. The polycarboxylic acids, polycarboxylic acid anhydrides, and polyols which can be employed in the preparation of the polycarboxy polyesters have been illustrated previously. The polycarboxy polyesters can be obtained by condensing, in accordance with known procedures, a polyhydric alcohol and a polycarboxylic acid or a polycarboxylic acid anhydride. This condensation reaction may be conducted, for example, by heating the reactants to a temperature within the range from 100° C. to 200° C., with or without an acidic catalyst. Water formed by the condenstion reaction may be removed by distillation. The course of the reaction may be followed by making acid number determinations and the reaction can be stopped when a suitable polycarboxy polyester has been obtained.

The invention also contemplates the modification of the properties and characteristics of the partially cured and fully cured compositions (resins) set forth previously in the discussion of the four preferred embodiments. Special and highly desirable effects can be imparted to the partially cured and fully cured compositions by incorporating a second active organic hardener (hereinafter termed "modifier") into the curable composition comprising the diepoxide monomer and "major" active organic hardener (i.e., polycarboxylic acid, polycarboxylic acid anhydride, polyol, polycarboxy polyester, and the like). The proportions of modifiers to "major" active organic hardener are such that the number of reactive groups contained by an amount of the modifier with relation to the number or reactive groups contained by an amount of the "major" active organic hardener will be in a ratio that is less than one. It is to be understood that the term "reactive groups" pertains to groups which are reactive with the epoxy groups contained in the monomeric diepoxide. For instance, to a curable composition comprising a monomeric diepoxide and a polycarboxylic acid, there can be added an amount of a modifier, e.g., polycarboxylic acid anhydride, polycarboxy polyester, polyol, etc., such that the ratio of reactive groups contained by the modifier with respect to the carboxy groups contained by the polycarboxylic acid is less than one. On this basis the modifier can be considered to be the minor component in relation to the polycarboxylic acid. As a second illustration, if the curable composition comprises a monomeric diepoxide and a polyol, an amount of modifier, e.g., polycarboxylic acid, polycarboxy polyester, polycarboxylic acid anhydride, polyisocyanate, polythiol, etc., can be added to said curable mixture such that the ratio of the reactive groups contained by the modifier with respect to the hydroxy groups contained by the polyol is less than one. Again it will be noted that the modifier is the minor component with respect to the polyol. The modifiers which can be employed are those illustrated previously in the discussion of the polycarboxylic acids, polycarboxylic acid anhydrides, polyols, polycarboxy polyesters, etc.

A fifth preferred embodiment is directed to curable, partially cured, and cured compositions comprising a monomeric diepoxide characterized by Formula I supra and a polyfunctional amine in such relative amounts so as to provide from about 0.2 to about 5.0 amino hydrogen atoms of said polyfunctional amine per epoxy group of said monomeric diepoxide, and preferably from about 0.8 to about 2.0 amino hydrogen atoms per epoxy group. By the term "polyfunctional amine," as used herein including the appended claims, is meant an organic amine having at least two active amino hydrogen atoms which can be on the same nitrogen atom or on different nitrogen atoms.

Among the polyfunctional amine subclasses contemplated include the aliphatic amines, aromatic amines, aralkyl amines, cycloaliphatic amines, alkaryl amines, aliphatic polyamines including polyalkylene polyamines, amino-substituted monohydric and polyhydric aliphatic alcohols and phenols, polyamides, addition products of polyamines and low molecular weight epoxides containing oxirane oxygen linked to vicinal carbon atoms, and others.

The thermoset cured resins of the invention vary from soft and flexible to hard and rigid products, depending upon the proportion, the functionality, and the chain length of the active organic hardener employed. These resins are insoluble in many of the common organic solvents. The hard, infusible, rigid thermoset resins can be machined to desired shapes and configurations, and they can be polished to provide appealing finishes. The novel compositions, as indicated through the specification, are highly useful and valuable in fields such as the coatings, laminating, molding, encapsulation, etc., arts.

A sixth highly preferred embodiment is directed to curable, partially cured, and cured compositions comprising a monomeric diepoxide characterized by Formula I supra, a polycarboxylic acid anhydride which contains a polymerizable double bond, and an active olefinically unsaturated organic monomer. To the curable mixture, there can be added a fourth component, that is, a polyol such as those previously described. The polyol can contain olefinic unsaturation or it can be fully saturated. However, should the polyol contain olefinic unsaturation, then the polycarboxylic acid anhydride component can be fully saturated, if desired. Thus, in the four component system both the polycarboxylic acid anhydride and the polyol components can contain olefinic unsaturation, or either component can contain olefinic unsaturation. The three and four component curable systems have been found to possess several highly desirable and unexpected advantages. The preferred systems cure very readily and gelation is often manifest at room temperature. Many of the resulting cured resins exhibit extremely high and efficient thermal stability at elevated temperatures by virtue of including the active olefinically unsaturated organic monomer in the curable compositions. The inclusion of the active olefinically unsaturated organic monomer to the curable system also results in the lowering of the melt temperature, and in the reduction of the viscosity of the system as compared to the corresponding curable system lacking same. The saturated and unsaturated polycarboxylic acid anhydrides and polyols have been illustrated previously. Maleic anhydride is highly preferred as the polycarboxylic acid anhydride component. It is desirable that the relative proportions of monomeric diepoxide, polycarboxylic acid anhydride, and active olefinically unsaturated organic monomer, with or without the polyol component (preferably polyhydric alcohol compound), comprising the curable compositions are such so as to provide from about 0.2 to about 5.0 (preferably from about 0.4 to about 2.0) carboxy groups of anhydride per epoxy group of monomeric diepoxide, and from 0.0 to about 2.0 (preferably from about 0.05 to about 1.0) hydroxy group of polyol per epoxy group of monomeric diepoxide. The quantity of active olefinically unsaturated organic monomer is most conveniently based on a ratio of ethylenic groups of said monomer per ethylenic group of monomeric diepoxide, anhydride, and/or polyol. Thus, it is desirable to employ the polycarboxylic acid anhydride, polyol, and active olefinically unsaturated organic monomer in amounts so as to provide from about 0.002 to about 5.0, preferably from about 0.2 to about 2.0, ethylenic groups of active olefinically unsaturated organic monomer per ethylenic group of monomeric diepoxide, polycarboxylic acid anhydride, and/or polyol. It should be noted that the term "ethylenic group" refers to the

group. Illustrative active olefinically unsaturated monomers include the mono- and poly-olefinic hydrocarbons, e.g., the heptenes, the nonenes, hexadiene, cyclopentene, cyclohexene, lower alkyl substituted-cyclohexene, styrene, divinylbenzene, and the like; the olefinic esters, ethers, and acids, e.g., divinyl ether, diallyl ether, di(2-butenyl) ether, methyl methacrylate, propyl acrylate, methyl acrylate, ethyl acrylate, methyl crotonate, allyl crotonate, crotonic acid, cinnamic acid, acrylic acid, diallyl phthalate, 2-pentenoic acid, and the like; and the halogenated vinyl-benzenes, and the like. Styrene is highly preferred.

The use of catalysts in the novel curable compositions described in the sixth embodiment is optional. Acidic and basic catalysts such as those described previously can be employed, if desired, to increase the rate of reaction between the polycarboxylic acid anhydride and diepoxy sulfone. In certain instances, it may be desirable to catalyze the reaction or polymerization of the polycarboxylic acid anhydride and the active olefinically unsaturated organic monomer. Among such latter catalysts are, by way of illustration, benzoyl peroxide, t-butyl hydroperoxide, cumene hydroperoxide, acetyl peroxide, p-menthane hydroperoxide, lauroyl peroxide, di-t-butyl peroxide, t-butyl perbenzoate, and the like.

A seventh preferred embodiment is directed to curable and partially cured compositions (fusible thermosetting intermediate reaction products that are viscous liquids or solids) comprising a monomeric diepoxide characterized by Formula I supra, and an active organic hardener, with or without a modifier, said compositions being dissolved in an inert normally-liquid organic medium such as xylene, methyl isobutyl ketone, butyl acetate, ethyl acetate, toluene, amyl acetate, and the like. The compositions dissolved in the above exemplary list of organic media can be used as, for example, surface coating which can be subsequently heat cured to hard, tough, scratch-resistant coatings.

The proportion of partially cured resin, i.e., fusible thermosetting intermediate reaction products, to organic media will depend on various factors such as the particular mixture being cured, the degree or extent of the partial cure, the particular organic medium employed, and other considerations. In general, a solution comprising from about 10 to about 90 weight percent of the partially cured resin, based on the total weight of partially cured resin and organic medium, is suitable; from about 40 to 70 weight percent of the partially cured resin, based on the total weight of partially cured resin and organic medium, is preferred. Moreover, the uncured compositions can be dissolved in the organic media exemplified above and applied to surfaces and subsequently heat cured to form hard, tough coatings. Should the solution comprising the uncured composition or partially cured composition tend to "run" when applied to the surface, a conventional wetting agent and/or thixotropic agent can be added to the solution mixture to ensure a more uniform coating on the surface.

In another preferred embodiment, the invention is directed to the preparation of valuable varnishes which are obtained by the reaction of a monomeric diepoxide characterized by Formula I supra with aliphatic monocarboxylic acids, at elevated temperatures, e.g., from about 100° to about 200° C., for a period of time ranging from about 0.5 to 10 hours, and longer, followed by homopolymerizing the resulting reaction product (which contains residual or free epoxy and hydroxy groups) with a catalyst such as those described previously, preferably at a temperature in the range of from about 25° to 250° C., to thus produce high molecular weight polymeric products commonly known to the art as a varnish. The amounts of aliphatic monocarboxylic acid and monomeric diepoxide employed are such so as to provide from about 0.3 to about 0.7 carboxy group of monocarboxylic acid per epoxy group of diepoxide. The unsaturated aliphatic monocarboxylic acids are preferred. Illustrative acids include hexanoic acid, caprylic acid, lauric acid, capric acid, myristic acid, oleic acid, linoleic acid, stearic acid, licanic acid, ricinoleic acid, hexenoic acid, hexadienoic acid, octenoic acid, and the like. Acids derived from natural sources such as castor oil, dehydrated castor oil, coconut oil, cottonseed oil, oiticaca oil, perilla oil, olive oil, safflower oil, sardine oil, soyabean oil, tall oil, tung oil, and the like, are advantageous to employ both from an economy standpoint and since highly useful varnishes result from the process. If desired, the reaction between monomeric diepoxide and the aliphatic monocarboxylic acid can be effected in the presence of a catalyst such as those described previously, and also, the reaction can be conducted in the presence of an inert normally-liquid organic medium. Suitable media include, for instance, the aromatic hydrocarbons, e.g., benzene, toluene, xylene, ethylbenzene, and the like; the saturated aliphatic and cyclo-aliphatic hydrocarbons, e.g., hexane, heptane, cyclopentane, cyclohexane, lower alkyl substituted-cyclohexane, and the like; the oxygenated organic compounds, e.g., ethyl acetate, butyl acetate, amyl acetate, acetone, methyl ethyl ketone, methyl isobutyl ketone, cyclohexanone, tetrahydrofuran, dioxane, diisopropyl ether, and the like. The homopolymerization of the reaction product which contains residual or free epoxy and hydroxy groups can also be effected, if desired, in the presence of an inert normally-liquid organic medium such as those illustrated supra. The progress of the homopolymerization reaction can be observed by determining the relative viscosity of samples drawn from the reaction mixture. In this manner, it is possible to produce partially polymerized compositions or essentially complete polymerized compositions.

The polymerized compositions of the last mentioned preferred embodiment generally are obtained as solid-like products. These polymerized compositions can be classified as drying compositions or non-drying compositions. The former are those which contain ethylenic unsaturation whereas the latter are saturated compositions. Both the drying and non-drying compositions are useful as modifiers for coating resins such as phenol-formaldehyde resins, melamine-formaldehyde resins, alkyl resins, and the like. These compositions are outstanding as modifiers because they have a wide range of compatability, they impart improved caustic, water, and chemical resistance to the resin coatings they are modifying, and they impart improved flexibility and toughness. The drying compositions are capable of "drying" or curing to excellent protective coatings, with or without the application of heat. It is generally desirable to employ various metallic salts of organic compounds known to the art as "driers" to accelerate the drying process. The drying can be accomplished at temperatures in the range of from about 10° to about 250° C. and for a period of time sufficient to produce the desired property in the resin. The concentration of the drier compound can range from about 0.001 to about 5.0 weight percent, and higher, based on the weight of the drying compound (polymer). Suitable driers include soluble compounds containing heavy metals, e.g., cobalt, lead, manganese, calcium, zinc, iron, and the like. Examples of such driers include cobalt naphthenate, lead octanoate, and the like. The drying compositions can be treated in the various ways familiar to the varnish and paint industries to produce special or advantageous effects.

In a still further preferred embodiment, valuable varnish compositions can be obtained by the reaction of a monomeric diepoxide characterized by Formula I supra with polyol(s), preferably diol(s), at a temperature in the range of from about 25° to about 250° C., for a period of time ranging from about 0.5 to 10.0 hours, and longer, followed by partial or essentially complete esterification of the fusible, polymeric polyhydric product with an aliphatic monocarboxylic acid, preferably at elevated temperatures, to produce high molecular weight polymeric products (varnishes) which may contain residual or free hydroxy groups. The proportions of polyol and monomeric diepoxide employed are such so as to provide from about 0.5 to about 1.5 hydroxy groups, of polyol per epoxy group of monomeric diepoxide. The polyols and aliphatic monocarboxylic acids which can be employed have been illustrated previously. The use of catalysts and solvents, if desired, has also been discussed supra.

In the following illustrative examples, the examination or description of the resins were conducted at room temperature, i.e., about 24° C. The term "acid number" is the number of milligrams of potassium hydroxide which are required to neutralize the free acid in a gram of substance. The "acid numbers" are determined by dissolving the sample for analysis in acetone and titrating with a standard alcoholic potassium hydroxide solution using phenolphthalein as the indicator. When a solvent is present with the reaction mixture being analyzed, the acid numbers reported are for the reaction mixture only and a correction is made so as not to include the solvent. Total solids present in the polymer solutions are determined by weighing about a one-gram sample of the solution in an aluminum weighing dish measuring about two inches in diameter, heating the open dish in a mechanically convected oven at 160° C. for about fifteen minutes, cooling it to room temperature, and weighing the residue.

EXAMPLE 1

To a reaction vessel which contains 242 grams of bis (tricyclo[5.2.1.0$^{2,6}$]dec-3-en-8-yl) carbonate maintained under stirring at 30° C., there was added, dropwise, over a period of about 2.3 hours 693 grams of a 24.4 weight per cent solution of peracetic acid in ethyl acetate. The resulting solution was maintained at 30° C. for an additional 4 hours and then stored overnight, i.e., about 16 hours, at 0° C. Thereafter, the solution was heated to about 30° to 35° C. for 2 hours. The reaction was 96 per cent complete as indicated by titration for peracetic acid analysis. The volatile materials, e.g., ethyl acetate, acetic acid by product, etc., were removed from the reaction product mixture by co-distillation with ethylbenzene. It was observed that the residue partially crystallized on standing at 0° C. Filtration of said residue yielded 260 grams of bis(4 - oxatetracyclo[6.2.1.0$^{2,7}$.0$^{3,5}$]undec-9-yl) carbonate which had the following properties: M.P. 131°–132° C. Calculated for $C_{12}H_{26}O_5$: Analyzed C, 70.37; H, 7.31. Found: C, 70.41; H, 7.32.

EXAMPLE 2

To a reaction vessel which contains 205 grams of bis (tricyclo[5.2.1.0$^{2,6}$]dec-3-en-8-yl) adipate (boiling point: 260° C./3 mm. of Hg), there is added, dropwise, over a period of 2 hours 365 grams of a 25 weight percent solution of peracetic acid in ethyl acetate. The addition of the peracetic acid solution to the reaction vessel is accomplished while maintaining the contents in said vessel at about 30° C., under agitation. The resulting solution then is maintained at about 30° to 35° C. for an additional 6 hours. After this period of time, titration for peracetic acid analysis indicates that the reaction is essentially complete. The volatile materials, e.g., ethyl acetate, acetic acid by-product, etc., are removed from the reaction product mixture by co-distillation with ethylbenzene. Residual ethylbenzene is recovered from the residue by heating same to about 80° C. at 2 mm. of Hg for about one hour. There is obtained a pale, yellow-colored product, i.e., bis(4 - oxatetracyclo[6.2.1.0$^{2,7}$.0$^{3,5}$]undec - 9 - yl) adipate which has a purity of 88 percent by epoxide titration (hydrogen bromide method).

EXAMPLE 3

To a reaction vessel which contains 190 grams of bis (tricyclo[5.2.1.0$^{2,6}$]dec-3-en-8-yl) maleate, there is added dropwise, over a period of 2 hours 365 grams of a 25 weight percent solution of peracetic acid in ethyl acetate. The addition of the peracetic acid solution to the reaction vessel is accomplished while maintaining the contents in said vessel at about 30° C., under agitation. The resulting solution then is maintained at about 30° to 35° C. for an additional 6 hours. After this period of time, titration for peracetic acid analysis indicates that the reaction is essentially complete. The volatile materials, e.g., ethyl acetate, acetic acid by-product, etc., are removed from the reaction product mixture by co-distillation with ethylbenzene. Residual ethylbenbzene is recovered from the residue by heating same to about 80° C. at 2 mm. of Hg for about one hour. There is obtained bis(4 - oxatetracyclo [6.2.1.0$^{2,7}$.0$^{3,5}$]undec-9-yl) maleate which has a purity of 85 percent by epoxide titration (hydrogen bromide method). The infrared absorption curve discloses that the ethylenic group of the maleoyl moiety is not affected during the epoxidation reaction.

EXAMPLE 4

The preparation of allyl tricyclo[5.2.1.0$^{2,6}$]dec-3-en-8-yl Δ$^1$-tetrahydrophthalate is prepared by the reaction of equimolar quantities of allyl alcohol with Δ$^1$-tetrahydrophthalic anhydride, followed by esterifying the resulting monocarboxy monoester product with excess tricyclo[5.2.1.0$^{2,6}$]dec-3-en-8-ol. The excess alcohol is recovered from the reaction product mixture via distillation. There is obtained a viscous, yellow-colored liquid product.

To a reaction vessel which contains 342 grams of allyl tricyclo[5.2.1.0$^{2,6}$]dec-3-en-8-yl Δ$^1$-tetrahydrophthalate, there is added, dropwise, over a period of 3 hours 680 grams of a 25 weight percent solution of peracetic acid in ethyl acetate. The addition of the peracetic acid solution to the reaction vessel is accomplished while maintaining the contents in said vessel at about 30° C., under agitation. The resulting solution then is heated to about 70° C. for an additional 4 hours. After this period of time, titration for peracetic acid analysis indicates that the reaction is essentially complete. The volatile materials, e.g., ethyl acetate, acetic acid by-product, etc., are removed from the reaction product mixture by co-distillation with ethylbenzene. Residual ethylbenzene is recovered from the residue by heating same to about 80° C. at 2 mm. of Hg for about one hour. There is obtained a pale, yellow-colored, viscous liquid product, i.e., 2,3-epoxypropyl 4-oxatetracyclo[6.2.1.0$^{2,7}$.0$^{3,5}$]undec-9-yl Δ$^1$-tetrahydrophthalate which has a purity of 83 percent by epoxide titration (hydrogen bromide method). The infrared absorption spectrum is consistent with the assigned structure.

EXAMPLE 5

The reaction of equimolar quantities of 6-methyl-3-cyclohexenylmethanol and succinic anhydride, followed by esterifying the resultant monocarboxy monester product with excess tricyclo[5.2.1.0$^{2,6}$]dec-3-en-8-ol yields 6-methyl-3-cyclohexenylmethyl tricyclo[5.2.1.0$^{2,6}$]dec-3-en-8-yl succinate, a viscous, amber-colored liquid.

To a reaction vessel which contains 179 grams of 6-methyl-3-cyclohexenylmethyl tricyclo[5.2.1.0$^{2,6}$]dec-2-en-8-yl succinate, there is added, dropwise, over a period of 2 hours 360 grams of a 25 weight percent solution of peracetic acid in ethyl acetate. The addition of the peracetic acid solution to the reaction vessel is accomplished while maintaining the contents in said vessel at about 30° C., under agitation. The resulting solution then is maintained at about 30° to 35° C. for an additional 5 hours. After this period of time, titration for peracetic acid analysis indicates that the reaction is essentially complete. The volatile materials, e.g., ethyl acetate, acetic acid by-product, etc., are removed from the reaction product mixture by co-distillation with ethylbenzene. Residual ethylbenzene is recovered from the residue by heating same to about 80° C. at 2 mm. of Hg for about one hour. There is obtained a very viscous liquid product, i.e., 6-methyl-3,4-epoxycyclohexylmethyl 4-oxatetracyclo[6.2.1.0$^{2,7}$.0$^{3,5}$]undec-9-yl succinate which has a purity of 86 percent by epoxide titration (hydrogen bromide method).

EXAMPLE 6

To a reaction vessel, there are charged 100 parts by weight of 2,3-epoxypropyl 4-oxatetracyclo[6.2.1.0$^{2,7}$.0$^{3,5}$]undec-9-yl carbonate and 2 parts by weight of boron trifluoride-piperidine complex. The resulting admixture then is heated to 120° C. for a period of 4 hours plus an additional 6 hours at 160° C. There is obtained a hard, solid homopolymeric product.

EXAMPLE 7

To a reaction vessel, there are charged 100 parts by weight of 3,4-epoxycyclohexyl 4-oxatetracyclo-[6.2.1.0$^{2,7}$.0$^{3,5}$]undec-9-yl carbonate and 3 parts by weight of boron trifluoride-monoethylamine complex. The resulting admixture then is heated to 120° C. for a period of 6 hours plus an additional 6 hours at 160° C. There is obtained a hard, solid homopolymeric product.

EXAMPLE 8

To a reaction vessel, there are charged 100 parts by weight of 2,3-epoxycyclopentylmethyl 4-oxatetracyclo-[6.2.1.0$^{2,7}$.0$^{3,5}$]undec-9-yl carbonate and 3 parts by weight of sulfuric acid (contained as a 25 weight percent aqueous solution). The resulting admixture then is heated to 120° C. for a period of 2 hours plus an additional 8 hours at 160° C. There is obtained a hard, solid homopolymeric product.

EXAMPLE 9

To a reaction vessel, there are charged 100 parts by weight of 3-oxatricyclo[3.2.1.0$^{2,4}$]oct-6-yl 4-oxatetracyclo[6.2.1.0$^{2,7}$.0$^{3,5}$]undec-9-yl carbonate and 2 parts by weight of boron trifluoride-piperidine complex. The resulting admixture then is heated to 120° C. for a period of 4 hours plus an additional 6 hours at 160° C. There is obtained a hard, solid homopolymeric product.

EXAMPLE 10

To a reaction vessel, there are charged 100 parts by weight of bis(4-oxatetracyclo[6.2.1.0$^{2,7}$.0$^{3,5}$]undec-9-yl) carbonate and 3 parts by weight of boron trifluoride-1,6-hexanediamine complex. The resulting admixture then is heated to 120° C. for a period of 6 hours plus an additional 6 hours at 160° C. There is obtained a hard, solid homopolymeric product.

EXAMPLE 11

To a reaction vessel, there are charged 100 parts by weight of 2,3-epoxypropyl 4-oxatetracyclo[6.2.1.0$^{2,7}$.0$^{3,5}$]undec-9-yl oxalate and 2 parts by weight of boron trifluoride-piperidine complex. The resulting admixture then is heated to 120° C. for a period of 4 hours plus an additional 6 hours at 160° C. There is obtained a hard, solid homopolymeric product.

EXAMPLE 12

To a reaction vessel, there are charged 100 parts by weight of 3,4-epoxycyclohexyl 4-oxatetracyclo-[6.2.1.0$^{2,7}$.0$^{3,5}$]undec-9-yl adipate and 3 parts by weight of boron trifluoride-piperidine complex. The resulting admixture then is heated to 120° C. for a period of 4 hours plus an additional 6 hours at 160° C. There is obtained a hard, solid homopolymeric product.

EXAMPLE 13

To a reaction vessel, there are charged 100 parts by weight of 3-oxatricyclo[3.2.1.0$^{2,4}$]oct-6-yl 4-oxatetracyclo[6.2.1.0$^{2,7}$.0$^{3,5}$]undec-9-yl maleate and 3 parts by weight of benzenesulfonic acid. The resulting admixture then is heated to 100° C. for a period of 3 hours plus an additional 6 hours at 160° C. There is obtained a hard, solid homopolymeric product.

EXAMPLE 14

To a reaction vessel, there are charged 100 parts by weight of bis(4-oxatetracyclo[6.2.1.0$^{2,7}$.0$^{3,5}$]undec-9-yl) fumarate and 3 parts by weight of boron trifluoride-piperidine complex. The resulting admixture then is heated to 80° C. for a period of 2 hours plus 4 hours at 120° C. plus an additional 6 hours at 160° C. There is obtained a hard, solid homopolymeric product.

EXAMPLE 15

To a reaction vessel, there are charged 2,3-epoxy-propyl 4-oxatetracyclo[6.2.1.0$^{2,7}$.0$^{3,5}$]undec-9-yl carbonate and sebacic acid in amounts so as to provide 0.5 carboxy group of said acid per epoxy group of said carbonate. The resulting admixture subsequently is heated to 80° C. for a period of 2 hours plus 2 hours at 120° C. plus an additional 4 hours at 180° C. There is obtained a hard, tough, solid resin.

EXAMPLE 16

To a reaction vessel, there are charged 9,10-epoxy-octadecyl 4-oxatetracyclo[6.2.1.0$^{2,7}$.0$^{3,5}$]undec-9-yl carbonate and pimelic acid in amounts so as to provide 0.8 carboxy group of said acid per epoxy group of said carbonate. The resulting admixture subsequently is heated to 80° C. for a period of 2 hours plus 4 hours at 120° C. plus an additional 4 hours at 180° C. There is obtained a hard, tough, solid resin.

EXAMPLE 17

To a reaction vessel, there are charged bis(4-oxatetracyclo[6.2.1.0$^{2,7}$.0$^{3,5}$]undec-9-yl) carbonate and adipic acid in amounts so as to provide 1.2 carboxy groups of said acid per epoxy group of said carbonate. The resulting admixture subsequently is heated to 100° C. for a period of 2 hours plus 4 hours at 140° C. plus an additional 4 hours at 200° C. There is obtained a hard, tough, solid resin.

EXAMPLE 18

To a reaction vessel, there are charged 2,3-epoxypropyl-4-oxatetracyclo[6.2.1.0$^{2,7}$.0$^{3,5}$]undec-9-yl carbonate and succinic anhydride in amounts so as to provide 1.0 carboxy group of said anhydride per epoxy group of said carbonate. The resulting admixture subsequently is heated to 80° C. for a period of 2 hours plus 4 hours at 120° C. plus an additional 4 hours at 160° C. There is obtained a hard, solid resin.

EXAMPLE 19

To a reaction vessel, there are charged 2,3-epoxypropyl 4-oxatetracyclo[6.2.1.0$^{2,7}$.0$^{3,5}$]undec-9-yl malonate and glutaric acid in amounts so as to provide 1.0 carboxy group of said acid per epoxy group of said malonate. The resulting admixture subsequently is heated to 80° C. for a period of 2 hours plus 4 hours at 120° C. plus an additional 4 hours at 180° C. There is obtained a hard, tough, solid resin.

EXAMPLE 20

To a reaction vessel, there are charged 2,3-epoxycyclopentylethyl 4-oxatetracyclo[6.2.1.0$^{2,7}$.0$^{3,5}$]undec-9-yl adipate and adipic acid in amounts so as to provide 0.8 carboxy group of said acid per epoxy group of said adipate. The resulting admixture subsequently is heated to 100° C. for a period of 2 hours plus 4 hours at 150° C. plus an additional 4 hours at 200° C. There is obtained a hard, tough, solid resin.

EXAMPLE 21

To a reaction vessel, there are charged bis(4-oxatetracyclo[6.2.1.0$^{2,7}$.0$^{3,5}$]undec-9-yl) glutarate and maleic anhydride in amounts so as to provide 1.0 carboxy group of said anhydride per epoxy group of said glutarate. The resulting admixture subsequently is heated to 80° C. for a period of 2 hours plus 4 hours at 120° C. plus an additional 6 hours at 160° C. There is obtained a hard, tough, solid resin.

EXAMPLE 22

To a reaction vessel, there are charged 2,3-epoxypropyl 4-oxatetracyclo[6.2.1.0$^{2,7}$.0$^{3,5}$]undec-9-yl Δ$^1$-tetrahydrophthalate and chlorendic anhydride in amounts so as to provide 1.0 carboxy group of said anhydride per epoxy group of said Δ$^1$-tetrahydrophthalate. The resulting admixture subsequently is heated to 120° C. for a period of 6 hours plus an additional 6 hours at 160° C. There is obtained a hard, strong, solid resin.

EXAMPLE 23

To a reaction vessel, there are charged 3,4-epoxycyclohexylpropyl 4-oxatetracyclo[6.2.1.0$^{2,7}$.0$^{3,5}$]undec-9-yl itaconate and phthalic anhydride in amounts so as to provide 1.2 carboxy groups of said anhydride per epoxy group of said itaconate. The resulting admixture subsequently is heated to 100° C. for a period of 2 hours plus 4 hours at 120° C. plus an additional 4 hours at 180° C. There is obtained a hard, solid resin.

EXAMPLE 24

To a reaction vessel, there are charged 3-oxatricyclo[3.2.1.0$^{2,4}$]oct-6-yl 4-oxatetracyclo[6.2.1.0$^{2,7}$.0$^{3,5}$]undec-9-yl adipate and itaconic acid in amounts so as to provide 0.5 carboxy group of said acid per epoxy group of said adipate. The resulting admixture subsequently is heated to 100° C. for a period of 2 hours plus 2 hours at 120° C. plus an additional 6 hours at 160° C. There is obtained a hard, solid resin.

EXAMPLE 25

An admixture of 2,3-epoxypropyl 4-oxatetracyclo[6.2.1.0$^{2,7}$.0$^{3,5}$]undec-9-yl carbonate and ethylene glycol is prepared in such relative amounts so as to provide 0.8 hydroxy group of said ethylene glycol per epoxy group of said carbonate. Boron trifluoride-monoethylamine complex (3 weight percent, based on the total weight of the reactants) then is added thereto. Subsequently, the resulting admixture is heated to 120° C. for a period of 4 hours plus an additional 8 hours at 170° C. There is obtained a hard, tough, solid resin.

EXAMPLE 26

An admixture of bis(4-oxatetracyclo[6.2.1.0$^{2,7}$.0$^{3,5}$]undec-9-yl) maleate and glycerol is prepared in such relative amounts so as to provide 1.2 hydroxy groups of said glycerol per epoxy group of said maleate. Boron trifluoride-1,6-hexanediamine complex (4 weight percent, based on the total weight of the reactants) then is added thereto. Subsequently, the resulting admixture is heated to 120° C. for a period of 2 hours plus an additional 8 hours at 170° C. There is obtained a hard, solid resin.

EXAMPLE 27

An admixture of 3-oxatricyclo[3.2.1.0$^{2,4}$]oct-6-yl 4-oxatetracyclo]6.2.1.0$^{2,7}$.0$^{3,5}$]undec-9-yl adipate and resorcinol is prepared in such relative amounts so as to provide 1.0 hydroxy group of said ethylene resorcinol per epoxy group of said adipate. Boron trifluoride-piperidine complex (2 weight percent, based on the total weight of the reactants) then is added thereto. Subsequently, the resulting admixture is heated to 120° C. for a period of 4 hours plus an additional 8 hours at 160° C. There is obtained a hard, solid resin.

EXAMPLE 28

A mixture is prepared from bis(4-oxatetracyclo[6.2.1.0$^{2,7}$.0$^{3,5}$]undec-9-yl) maleate and adipic acid in amounts so as to provide 0.7 carboxy group of said adipic acid per epoxy group of said maleate. The resulting mixture is heated to 100° C. for a period of 10 minutes, and upon cooling to room temperature, i.e., approximately 24° C., a fusible, thermosetting product is obtained. The resulting product is dissolved in methyl isobutyl ketone at 100° C., and an iron panel or strip is dipped into the resulting solution. The iron panel subsequently is removed from this solution, is air dried for 30 minutes, and is baked at 160° C. for 3 hours. A thin coating is observed on that portion of the dipped iron panel. The resulting coating on the panel is glossy and tough. The coating displays excellent adhesion to the panel.

EXAMPLE 29

A mixture is prepared from bis(4-oxatetracyclo-[6.2.1.0$^{2,7}$.0$^{3,5}$]undec-9-yl) adipate and phthalic anhydride in amounts so as to provide 1.0 carboxy group of said phthalic anhydride per epoxy group of said adipate. The resulting mixture is heated to 120° C. for a period of 5 minutes, and upon cooling to room temperature, i.e., approximately 24° C., a fusible, thermosetting product is obtained. The resulting product is dissolved in butyl acetate at 100° C., and an iron panel or strip is dipped into the resulting solution. The iron panel is removed almost immediately from this solution, is allowed to air dry for 15 minutes, and subsequently is baked at 160° C. for 45 minutes. A thin coating is observed on that portion of the dipped iron panel. The resulting coating on the panel is hard and tough. The coating displays excellent adhesion to the panel.

EXAMPLE 30

Bis(4 - oxatetracyclo[6.2.1.0²,⁷.0³,⁵]undec-9-yl) fumarate and dehydrated castor oil acid are admixed in amounts so as to provide 0.5 carboxy group of said acid per epoxy group of said fumarate. The resulting admixture then is heated for 3.5 hours at 200° C. to give a viscous product mixture which contains residual or free epoxy groups and hydroxy groups. This viscous product mixture subsequently is charged to a round-bottomed flask which is fitted with an air stirrer, nitrogen purge line, thermometer, and dropping funnel. Sufficient xylene solvent is added to give a 75 weight percent solution and the temperature of the resulting admixture is brought to about 50° to 60° C. An amount of stannic chloride (0.5 weight percent, based on the weight of said viscous product mixture) contained as a solution in ethyl acetate then is added dropwise to said admixture over a period of approximately one hour. As the polymerization increases, sufficient xylene is added thereto to facilitate stirring. The solids content of the resulting solution is about 55 weight percent. To the resulting high molecular weight polymeric product mixture (varnish), an iron panel is dipped therein and removed immediately. The resulting coated panel is air-dried for 15 minutes plus baking at 150° C. for 45 minutes. The coated panel resistance to boiling water (one hour) is excellent.

EXAMPLE 31

Bis(4 - oxatetracyclo[6.2.1.0²,⁷.0³,⁵]undec - 9 - yl) maleate and soyabean oil acid are admixed in amounts so as to provide 0.4 carboxy group of said acid per epoxy group of said maleate. The resulting admixture then is heated for 4 hours at 180° C. to give a viscous product mixture which contains residual or free epoxy groups and hydroxy groups. This viscous product mixture subsequently is charged to a round-bottomed flask which is fitted with an air stirrer, nitrogen purge line, thermometer, and dropping funnel. Sufficient xylene solvent is added to give a 78 weight percent solution and the temperature of the resulting admixture is brought to about 60° C. An amount of boron trifluoride-diethyl ether complex (0.2 weight percent of boron trifluoride, based on the weight of said viscous product mixture) contained in excess diethyl ether is then added dropwise to said admixture over a period of approximately 40 minutes. As the polymerization increases, sufficient xylene is added thereto to facilitate stirring. The solids content of the resulting solution is about 50 weight percent. To the resulting high molecular weight polymeric product mixture (varnish), an iron panel is dipped therein and removed immediately. The resulting coated panel is air-dried for 20 minutes plus baking at 160° C. for 40 minutes. The coated panel resistance to boiling water (one hour) is excellent.

Reasonable variations and modifications of the invention can be made or carried out in the light of the above disclosure without departing from the spirit and scope thereof.

What is claimed is:

1. A diepoxide characterized by the general formula:

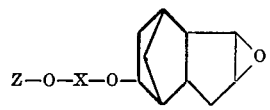

wherein Z is selected from the group consisting of (1) vicinal-epoxyalkyl radical having from 3 to 18 alkyl carbon atoms and in which the vicinal epoxy group is at least one carbon atom removed from the appropriate oxygen atom shown in the above formula, (2) vicinal-epoxycycloalkyl having from 5 to 7 carbon atoms in the cycloalkyl ring and in which the vicinal epoxy group is at least one carbon atom removed from the appropriate oxygen atom shown in the above formula, (3) vicinal-epoxycycloalkyl having from 5 to 7 carbon atoms in the cycloalkyl ring and in which the alkyl moiety contains up to 7 carbon atoms, (4) a 3-oxatricyclo[3.2.1.0²,⁴]oct-6-yl radical, (5) a 3-oxatricyclo[3.2.1.0²,⁴]oct-6-ylalkyl radical having up to 7 carbon atoms in the alkyl moiety; and wherein X is selected from the group consisting of (a) carbonyl, and (b) the unit,

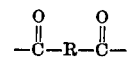

in which R represents the residue after removal of the two carboxy groups of a hydrocarbon dicarboxylic acid.

2. Vicinal-epoxyalkyl 4 - oxatetracyclo-[6.2.1.0²,⁷.0³,⁵] undec-9-yl carbonate in which the vicinal epoxy group of the vicinal-epoxyalkyl radical is at least one carbon atom removed from the carbonate group.

3. Vicinal - epoxycycloalkyl 4 - oxatetracyclo[6.2.1.0²,⁷.0³,⁵]undec-9-yl carbonate which has from 5 to 7 carbon atoms in the cycloalkyl ring and in which the vicinal epoxy group of the vicinal-epoxycycloalkyl radical is at least one carbon atom removed from the carbonate group.

4. Vicinal-epoxycycloalkylalkyl 4 - oxatetracyclo[6.2.1.0²,⁷.0³,⁵]undec-9-yl carbonate which has from 5 to 7 carbon atoms in the cycloalkyl ring and up to 7 carbon atoms in the alkyl moiety.

5. 3 - oxatricyclo[3.2.1.0²,⁴]oct-6-yl 4 - oxatetracyclo[6.2.1.0²,⁷.0³,⁵]undec-9-yl carbonate.

6. 3 - oxatricyclo[3.2.1.0²,⁴]oct- 6 - ylalkyl 4-oxatetracyclo[6.2.1.0²,⁷.0³,⁵]undec-9-yl carbonate which has up to 7 carbon atoms in the alkyl moiety.

7. Bis(4 - oxatetracyclo[6.2.1.0²,⁷.0³,⁵]undec - 9 - yl carbonate.

8. Vicinal-epoxyalkyl 4 - oxatetracyclo[6.2.1.0²,⁷.0³,⁵] undec-9-yl hydrocarbondicarboxylate in which the vicinal epoxy group of the vicinal-epoxyalkyl radical is at least one carbon atom removed from the hydrocarbondicarboxylate group.

9. Vicinal - epoxycycloalkyl 4 - oxatetracyclo[6.2.1.0²,⁷.0³,⁵]undec - 9 - yl hydrocarbondicarboxylate which has from 5 to 7 carbon atoms in the cycloalkyl ring and in which the vicinal epoxy group of the vicinal-epoxycycloalkyl radical is at least one carbon atom removed from the hydrocarbondicarboxylate group.

10. Vicinal - epoxycycloalkyl 4 - oxatetracyclo[6.2.1.0²,⁷.0³,⁵]undec - 9 - yl hydrocarbondicarboxylate which has from 5 to 7 carbon atoms in the cycloalkyl ring and up to 7 carbon atoms in the alkyl moiety.

11. 3 - oxatricyclo[3.2.1.0²,⁴]oct - 6-yl 4-oxatetracyclo[6.2.1.0²,⁷.0³,⁵]undec-9-yl hydrocarbondicarboxylate.

12. 3-oxatricyclo[3.2.1.0²,⁴]oct - 6 - ylalkyl 4-oxatetracyclo[6.2.1.0²,⁷.0³,⁵]undec-9-yl hydrocarbondicarboxylate which has up to 7 carbon atoms in the alkyl moiety.

13. The homopolymer of the composition defined in claim 1.

14. The homopolymer of the composition defined in claim 7.

15. The homopolymer of the composition defined in claim 8.

16. The homopolymer of the composition defined in claim 9.

17. The homopolymer of the composition defined in claim 10.

18. The homopolymer of the composition defined in claim 11.

19. The homopolymer of the composition defined in claim 12.

20. A curable composition comprising a diepoxide characterized by the general formula:

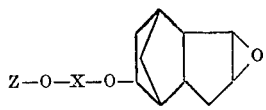

wherein Z is selected from the group consisting of (1) vicinal-epoxyalkyl radical having from 3 to 18 alkyl carbon atoms and in which the vicinal epoxy group is at least one carbon atom removed from the appropriate oxygen atom shown in the above formula, (2) vicinal-epoxycycloalkyl having from 5 to 7 carbon atoms in the cycloalkyl ring and in which the vicinal epoxy group is at least one carbon atom removed from the appropriate oxygen atom shown in the above formula, (3) vicinal-epoxycycloalkyl having from 5 to 7 carbon atoms in the cycloalkyl ring and in which the alkyl moiety contains up to 7 carbon atoms, (4) a 3-oxatricyclo[3.2.1.0$^{2,4}$]oct-6-yl radical, (5) a 3-oxatricyclo[3.2.1.0$^{2,4}$]oct-6-ylalkyl radical having up to 7 carbon atoms in the alkyl moiety; and wherein X is selected from the group consisting of (a) carbonyl, and (b) the unit,

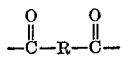

in which R represents the residue after removal of the two carboxy groups of a hydrocarbon dicarboxylic acid; and a curing amount of an active organic hardener selected from the group consisting of polycarboxylic acids, polycarboxylic acid anhydrides, polyols, polyisocyanates, and polyfunctional amines.

21. The fusible thermosetting intermediate reaction products obtained from the curable composition defined in claim 20.

22. The cured, thermoset resin obtained from the curable composition defined in claim 20.

23. The curable composition of claim 20 wherein said active organic hardener is a polycarboxylic acid anhydride.

24. The cured thermoset composition obtained from the curable composition defined in claim 18.

References Cited

UNITED STATES PATENTS

| | | | |
|---|---|---|---|
| 3,042,686 | 7/1962 | O'Brien et al. | 260—348 |
| 2,917,491 | 12/1959 | Phillips et al. | 260—348 |
| 2,260,753 | 10/1941 | Marple et al. | 260—78 |
| 2,543,419 | 2/1951 | Niederhauser | 260—348 |
| 2,609,357 | 9/1952 | Koroly | 260—78.4 |
| 2,623,023 | 12/1952 | Koroly | 260—78.4 |
| 2,768,153 | 10/1956 | Shokal | 260—78.4 |

FOREIGN PATENTS

| | | |
|---|---|---|
| 518,057 | 2/1940 | Great Britain. |

JOSEPH L. SCHOFER, *Primary Examiner.*

J. KIGHT III, *Assistant Examiner.*

U.S. Cl. X.R.

260—348, 2